United States Patent
Dez et al.

(10) Patent No.: US 7,687,421 B2
(45) Date of Patent: Mar. 30, 2010

(54) SINTERABLE NANOPOWDER CERAMIC MATERIAL AND METHOD FOR SYNTHESIS THEREOF

(75) Inventors: Romuald Dez, Suippes (FR); Nathalie Herlin-Boime, Orsay (FR)

(73) Assignee: Commissariat A l'Energie Atomique, Paris (FR)

( * ) Notice: Subject to any disclaimer, the term of this patent is extended or adjusted under 35 U.S.C. 154(b) by 299 days.

(21) Appl. No.: 10/587,905

(22) PCT Filed: Jan. 27, 2005

(86) PCT No.: PCT/FR2005/000174

§ 371 (c)(1),
(2), (4) Date: May 11, 2007

(87) PCT Pub. No.: WO2005/082808

PCT Pub. Date: Sep. 9, 2005

(65) Prior Publication Data

US 2007/0232479 A1    Oct. 4, 2007

(30) Foreign Application Priority Data

Jan. 30, 2004    (FR) .................................. 0400898

(51) Int. Cl.
*C04B 35/569* (2006.01)
*C04B 35/587* (2006.01)
*C04B 35/599* (2006.01)

(52) U.S. Cl. ................. 501/92; 501/96.1; 501/96.2; 501/96.5; 501/98.2

(58) Field of Classification Search .............. 501/92, 501/96.1, 96.2, 96.5, 98.2
See application file for complete search history.

(56) References Cited

U.S. PATENT DOCUMENTS 5,559,062 A * 9/1996 Okabe et al. ............... 264/625

(Continued)

FOREIGN PATENT DOCUMENTS

WO    02085812   *  4/2002

(Continued)

OTHER PUBLICATIONS

Martine Mayne, at al.: "Chemical Evolution of Laser Formed Si/C/N/Al (+Y)/O Nanopowders with Synthesis Conditions". $9^{TH}$ CIMTEC-World Ceramics Congress, Ceramics Getting Into the 2000'S—Part B, 1999, pp. 211-218. p. 212; figure 1; table 2.

(Continued)

*Primary Examiner*—Karl E Group
(74) *Attorney, Agent, or Firm*—Weingarten, Schurgin, Gagnebin & Lebovici LLP

(57) ABSTRACT

The invention provides a method of synthesizing a Si/C/N/$E_a$/$F_b$/$G_c$/O multielement nanopowder that is directly suitable for sintering, E, F, and G representing three distinct metallic elements other than Si, and at least one of a, b, and c being non-zero. The nanopowder is obtained by laser pyrolysis of an aerosol comprising at least one metal precursor, hexamethyldisilazane $Si_2C_6NH_{19}$ used as the sole solvent for said at least one metal precursor, and silane $SiH_4$. Each grain of the resulting nanopowder contains all of the elements Si, C, N, $E_a$, $F_b$, $G_c$, and O, and the chemical composition of the nanopowder in terms of equivalent stoichiometric compounds is such that its free carbon content is less than 2% by weight and its $SiO_2$ content is less than 10% by weight. The use of this nanopowder for fabricating a $Si_3N_4$/SiC composite ceramic.

6 Claims, 3 Drawing Sheets

U.S. PATENT DOCUMENTS

| | | | | |
|---|---|---|---|---|
| 6,844,282 | B2* | 1/2005 | Yoshimura | 501/97.4 |
| 7,008,893 | B2* | 3/2006 | Yoshimura | 501/96.4 |
| 7,077,991 | B2* | 7/2006 | Wan et al. | 264/405 |
| 7,128,850 | B2* | 10/2006 | Duan et al. | 252/518.1 |
| 7,132,061 | B2* | 11/2006 | Yoshimura | 252/500 |

OTHER PUBLICATIONS

M. Cauchetier et al.: "Si/C/N Nanocomposite Powders with Al (and Y) Additives Obtained by Laser Spray Pyrolysis of Organometallic Compounds". Journal of Materials Science, vol. 34, 1999, pp. 5257-5264.

B. Doucy et al.: "SiCN Nanocomposites: Powder Synthesis, Materials Processing and Ductility Assessment". Key Engineering Materials, vol. 206-213, 2002, pp. 1081-1084.

F. Tenegal et al: "Local Order Determination in SiCN(AlY) Laser-Synthesized Nanopowders by X-Ray Photoemission Spectroscopy". Journal of Applied Physics, vol. 87, No. 11, Jun. 1, 2000, pp. 7864-7870, "Experimental and Data Analysis".

Dez, R., et al.: "Laser synthesis of silicon carbonitride nanopowders; structure and thermal stability". Journal of the European Ceramic Society, Elsevier Science Publishers, Barking, Essex, GB, vol. 22, No. 16, Dec. 2002, pp. 2969-2979.

\* cited by examiner

SINTERABLE NANOPOWDER CERAMIC MATERIAL AND METHOD FOR SYNTHESIS THEREOF

This application is a §371 national phase filing of PCT/FR2005/000174 filed Jan. 27, 2005, and claims Priority to French application No. 04 00898 filed Jan. 30, 2004.

The invention relates to a method of synthesizing a multielement nanopowder that is directly suitable for sintering. The invention also provides a multielement nanopowder and a method of fabricating a $Si_3N_4/SiC$ composite ceramic in which the above-mentioned multielement nanopowder is used.

$Si_3N_4/SiC$ structural composite ceramics present properties such as high breaking strength, ability to withstand high temperatures, and low density, that make them particularly advantageous for applications involving thermal and mechanical stresses, for example in the aerospace or automobile industries. Nevertheless, the development of $Si_3N_4/SiC$ ceramics has been hampered by the great difficulty involved in forming them. Such forming requires a sintering step that generally needs to be followed by a machining step that turns out to be lengthy, difficult, and expensive because of the hardness of such ceramics.

Sintering is commonly defined as high-temperature treatment imparting mechanical cohesion to the sintered product: the particles of the powder come closer together and weld to one another, with the material densifying by a reduction in its porosity and with linear shrinkage.

In practice, sintering a ceramic consists essentially in heat treatment by heating the ceramic powder optionally in the presence of sintering additives, and optionally accompanied by said powder being compressed.

Sintering additives enable a liquid phase to appear at the surfaces of the grains of powder, thereby leading to densification of the ceramic.

For $Si_3N_4/SiC$ composite ceramics, it is known to use a ceramic nanopowder containing silicon (Si), carbon (C), and nitrogen (N), referred to as Si/C/N nanopowder, to make a slip for the purpose of mixing said nanopowder with optionally nanometric sintering additives, generally $Al_2O_3$ and $Y_2O_3$, to dry said slip, and to proceed finally with sintering. The step of mixing the nanopowder with sintering additives is nevertheless always difficult, and the distribution of the additive is never uniform. Unfortunately, this poor distribution can lead to defects in the final ceramic, thereby degrading its properties.

In order to eliminate that critical mixing step, one solution is to incorporate the sintering additive elements directly during the process of synthesizing the powder. To do that, a liquid mixture is made containing the elements Si, C, and N together with metal precursors comprising the sintering additive elements, e.g. aluminum (Al), oxygen (O), and yttrium (Y). An aerosol containing all of the above-mentioned elements is then generated from the liquid mixture. The aerosol, mixed with a gas, is then sent through a laser beam and a Si/C/N/Al/Y/O multielement nanopowder is recovered, as produced during the interaction between the laser beam and the mixture. The interaction step is referred to as "laser pyrolysis".

Thus, it is known to synthesize Si/C/N/Al/O nanopowders from a liquid mixture of hexamethyldisilazane $Si_2C_6NH_{19}$ (referred to below as HMDS), of isopropoxide $C_3H_7OH$, and of aluminum isopropoxide $C_9H_{21}O_3Al$, and also to synthesize Si/C/N/Al/Y/O nanopowders from a liquid mixture of HMDS, of isopropanol, of aluminum isopropoxide, and of yttrium isopropoxide $C_9H_{21}O_3Y$. Those liquid mixtures are pulverized by means of an aerosol generator and they are injected into a reactor where they are subjected to laser pyrolysis. It should be observed that HMDS reacts slowly with isopropanol so it is necessary to subject the mixture to treatment quickly once it has been made.

In that known method of synthesis, and in spite of the above-mentioned drawback, the presence of isopropanol is considered as being essential since it is believed that isopropanol favors solid isopropoxides dissolving in liquid HMDS, and that it reduces the viscosity of the resulting liquid mixtures, thus making it possible firstly to obtain uniform nebulization of the mixture, and secondly to obtain a mixture that is suitable for being used in an aerosol generator, i.e. a liquid mixture of viscosity that is sufficiently low and containing the smallest possible amount of non-dissolved solid compounds.

An example nanopowder, written nanopowder B, obtained by that known method of synthesis is given in the last line of the TABLE below. Since the resulting nanopowder is essentially amorphous, its chemical composition is expressed in element percentages by weight, which corresponds to element analysis. On the basis of this composition in terms of element, a chemical composition expressed in terms of equivalent stoichiometric compounds is determined by calculation, as is common practice in the field of ceramics. This chemical composition expressed in terms of equivalent stoichiometric compounds is useful in practice for performing calculations and making comparisons, however at this step in the method of fabricating the ceramic, it does not reflect reality.

The list of equivalent stoichiometric compounds is given in the right-hand column of the TABLE below, and it was drawn up on the assumption that all of the atoms of Al and of Y are in the form of $Al_2O_3$ and $Y_2O_3$, that the remaining atoms of oxygen are in the form of $SiO_2$, and then that all of the atoms of nitrogen N are in the form of $Si_3N_4$, and that the remaining atoms of Si are in the form of SiC; the excess free carbon atoms $C_{free}$ are obtained by taking the difference between the total amount of carbon atoms and the amount of carbon atoms bonded with Si in SiC. This serves to determine the contents of sintering additives $Al_2O_3$ and $Y_2O_3$, and also the contents of $SiO_2$ and $C_{free}$.

In the same manner as this example, nanopowders that have been obtained by previously-known methods of synthesis present high oxygen contents which lead to high $SiO_2$ contents and to high carbon contents which lead to large $C_{free}$ contents. Unfortunately, carbon inhibits densification of a nanopowder during sintering and is a source of defects, and thus of breaks in the resulting final ceramic. Furthermore, $SiO_2$ is harmful to the high-temperature mechanical properties of the ceramic.

Because of their composition, nanopowders synthesized using previously-known methods present very poor properties in terms of temperature stability (an average 30% loss of weight at 1500° C.), so they must necessarily be subjected to an annealing step prior to sintering.

An object of the method of the invention is to synthesize a multielement nanopowder that is thermally stable and directly suitable for sintering, i.e. a nanopowder that is suitable for quickly reaching density close to the theoretical density of the ceramic that it is desired to obtain without it being necessary prior to sintering to perform a mixing step or an annealing step, and preferably without it being necessary to subject the powder to any heat treatment. The term "mixing step" is used to mean a step of mixing the nanopowder with sintering additives, as has been done conventionally in the past, e.g. using a slip.

To achieve this end, the invention provides a method of synthesizing a Si/C/N/$E_a$/$F_b$/$G_c$/O multielement nanopowder directly suitable for sintering, where E, F, and G represent three distinct metallic elements other than Si, and at least one of a, b, and c is non-zero, the method comprising the following steps:

using an aerosol generator to generate an aerosol comprising at least one metal precursor containing at least one of said metallic elements, and hexamethyldisilazane $Si_2C_6NH_{19}$ (HMDS) used as a main source of Si and as the sole solvent for said at least one metal precursor;

adding to said aerosol silane $SiH_4$ or its equivalent in gaseous form so as to form a reaction mixture; and proceeding with laser pyrolysis of said reaction mixture.

It should be observed firstly that the $Si/C/N/E_a/F_b/G_c/O$ generic formula for the multielement nanopowder is not a stoichiometric formula and that the letters E, F, and G are selected arbitrarily to represent a plurality of possible metallic elements. These three letters are therefore not chemical element symbols (unlike the letters C, Si, O, . . . which are symbols for carbon, silicon, oxygen, . . . ).

Furthermore, throughout the present text, the indices a, b, and c serve solely to indicate the presence or the absence of the corresponding metallic element. Thus, these indices can either be zero, or else non-zero, in which case they are equal to 1. Nevertheless, as specified, at least one of the indices must be non-zero. When an index is zero, that means that the nanopowder does not contain the corresponding element, and when the index is non-zero (equal to 1), that means that the nanopowder contains the corresponding element. Thus, a $Si/C/N/E_a/F_b/G_c/O$ multielement nanopowder with non-zero a and zero b and c is a Si/C/N/E/O nanopowder that contains metallic element E, but contains neither F nor G.

In the method of the invention, no use is made of isopropanol, contrary to the technical prejudice which has been to consider that isopropanol is necessary to ensure proper dissolution of the solid precursor in HMDS and to decrease the viscosity of the liquid mixtures used. HMDS is the sole solvent used for dissolving the metal precursor(s), regardless of whether they are solid or liquid form, and against all expectations, the nanopowders synthesized by the inventors in the absence of isopropanol have shown that any solid precursors dissolve perfectly well in HMDS and that the viscosity of the solutions obtained turns out to be sufficiently low for those solutions to be capable of being used in an aerosol generator.

In addition, the absence of isopropanol $C_3H_7OH$ presents the advantage of limiting the oxygen content and the carbon content within the synthesized nanopowder, such that the contents of $SiO_2$ and $C_{free}$ are limited. By its very composition, the nanopowder therefore presents good temperature stability, and it is also directly suitable for sintering and can densify quickly.

Furthermore, adding silane $SiH_4$, or its equivalent, as a secondary source of silicon makes it possible to increase the Si content in the powder, thereby encouraging the formation of SiC from atoms of Si and excess carbon atoms, thus enabling the $C_{free}$ content to be limited.

Furthermore, the Si—H bonds of the silane, or of its equivalent, are effective absorbers of the radiation from the laser used for laser pyrolysis, thereby heating up the reaction mixture and enabling said mixture to be pyrolyzed at temperatures that are higher than they would be in the presence of HMDS without silane. Consequently, the decomposition of the metal precursors is better, and the local order of atoms within the grains of synthesized nanopowder is improved thereby. Such an ordered structure leads in particular to grains having surfaces that are less sensitive to pollution by adsorbing $O_2$ and $H_2O$, thereby contributing to reducing the content of O in the powder.

Thus, an equivalent of silane in the meaning of the invention is a compound comprising silicon and suitable for being used to increase the content of Si in the powder. In particular, as compounds that are equivalent to silane, mention can be made of methylsilanes having the general formula $(CH_3)_{4-x}SiH_x$, chlorosilanes having the general formula $Cl_{4-x}SiH_x$, with x=1, 2, or 3, and disilane $Si_2H_6$.

Advantageously, said metallic elements E, F, and G are selected from the following metallic elements: aluminum (Al), yttrium (Y), magnesium (Mg), ytterbium (Yb), and lanthanum (La). These elements are good sintering additive elements for composite ceramics of the $Si_3N_4/SiC$ type. It is preferable to select Al and Y as sintering metallic elements, or only one of those two elements.

As examples of metal precursors suitable for being used on their own or in combination, mention can be made of aluminum isopropoxide $C_9H_{21}O_3Al$, yttrium isopropoxide $C_9H_{21}O_3Y$, ytterbium isopropoxide $C_9H_{21}O_3Yb$, and aluminum secbutoxide $C_{12}H_{21}O_3Al$.

In a particular implementation of the method of the invention, ammonia $NH_3$, or its equivalent, is added to said aerosol in gaseous form. This addition of ammonia can serve to increase the nitrogen content in the powder. By acting on the added ammonia $NH_3$ and silane $SiH_4$ used in forming said reaction mixture, it is possible to vary the proportions of nitrogen and silicon in the powder, and for example to adjust the content of $Si_3N_4$, which has an influence on the mechanical properties of the final ceramic.

In the meaning of the invention, ammonia equivalents are gases containing nitrogen and suitable for being used to increase the nitrogen content in the powder. In particular, as compounds equivalent to ammonia, mention can be made of molecular nitrogen $N_2$, methylamine $CH_3NH_2$, and nitrogen protoxide $N_2O$.

The invention also provides a $Si/C/N/E_a/F_b/G_c/O$ multielement nanopowder where E, F, and G represent three distinct metallic elements other than Si, and at least one of a, b, and c is non-zero, the nanopowder being suitable for being obtained by the method of synthesis of the invention and being characterized in that it is directly suitable for sintering without being subjected to a prior mixing step or a prior annealing step, in that each nanopowder grain contains all of the elements Si, C, N, $E_a$, $F_b$, $G_c$, and O, and in that it presents a chemical composition expressed in terms of equivalent stoichiometric compounds determined by calculation from element analysis, such that the free carbon $C_{free}$ content thereof is less than 2% by weight and the silicon oxide $SiO_2$ content thereof is less than 10% by weight.

The characteristic whereby each nanopowder grain contains all of the elements Si, C, N, $E_a$, $F_b$, $G_c$, and O specifies clearly that the claimed nanopowder is a genuine multielement nanopowder. In the technical field of the invention, it sometimes happens that the term "X/Y/Z multielement nanopowder" is used abusively to describe a powder in which each grain does not contain all of the elements X, Y, and Z. It should also be observed that at present, numerous nanopowders synthesized by prior art methods are not multielement nanopowders in the meaning of the invention. A good distribution of the various elements in each grain, and in particular a good distribution of the sintering additive metallic elements (these elements being the above-mentioned, E, F, and G, it being recalled that only one or two of these elements need be present, depending on the values of the indices a, b, and c, as mentioned above), makes it possible to obtain a nanopowder that is suitable for being sintered directly, and consequently to obtain a ceramic that presents very few structural defects and thus presents good properties. In particular, the better the structure of the ceramic (i.e. defects are fewer, and the grains are fine and spherically shaped), the better the plastic deformation properties thereof and the easier it is to make ceramic parts with high precision, thereby limiting the machining step.

Advantageously, said metallic elements E, F, and G are selected from the following metallic elements: aluminum (Al), yttrium (Y), magnesium (Mg), ytterbium (Yb), and lanthanum (La).

Advantageously, the index c of $G_c$ is zero, so the nanopowder contains only two sintering metallic elements E and F. Furthermore, the metallic elements E and F are respectively advantageously aluminum Al and yttrium Y. Good results are obtained using only these two elements (these results are specified below).

Advantageously, the chemical composition of the nanopowder expressed in terms of equivalent stoichiometric compounds, as determined by calculation from the chemical composition in terms of elements, is such that the sum of the contents of $Al_2O_3$ and $Y_2O_3$ is greater than 3%. It is found that below this value, the nanopowder is more difficult to sinter.

The invention also provides the use of a $Si/C/N/E_a/F_b/G_c/O$ multielement nanopowder of the invention in fabricating a composite ceramic, and a method of fabricating a composite ceramic in which: a $Si/C/N/E_a/F_b/G_c/O$ multielement nanopowder that is directly suitable for sintering is synthesized using the synthesis method of the invention; and said nanopowder is sintered directly, i.e. without subjecting it to a prior mixing step or a prior annealing step (and preferably no other heat treatment either).

It is found that the $Si_3N_4/SiC$ composite ceramic obtained by the above-mentioned method differs from previously-known ceramics, in particular in the nanometric size of its grains. The invention thus also provides a composite ceramic of the $Si_3N_4/SiC$ type made from a $Si/C/N/E_a/F_b/G_c/O$ multielement nanopowder in which E, F, and G represent three distinct metallic elements other than Si, and in which at least one of a, b, and c is non-zero (i.e. equal to 1) and suitable for being obtained by the above-defined fabrication method, that is characterized by the fact that the grains constituting it are of nanometer size, i.e. less than 100 nanometers (nm).

The small size of the grains can make it possible in particular for the resulting $Si_3N_4/SiC$ ceramic to present good plasticity at high temperature, thereby making it easier to fabricate ceramic parts with good precision (e.g. by hot-forming) and to limit the machining step.

Advantageously, the $Si_3N_4/SiC$ composite ceramic of the invention presents density equal to 100% of its theoretical density. Such a density makes it possible, amongst other things, to guarantee good mechanical performance of the ceramic.

The invention can be well understood and its advantages will appear better on reading the following detailed description of a particular implementation of the method of the invention, of an example of a nanopowder of the invention, and of an example of the use of said nanopowder to fabricate a composite ceramic. The description refers to the accompanying drawings, in which.

Figure 1:
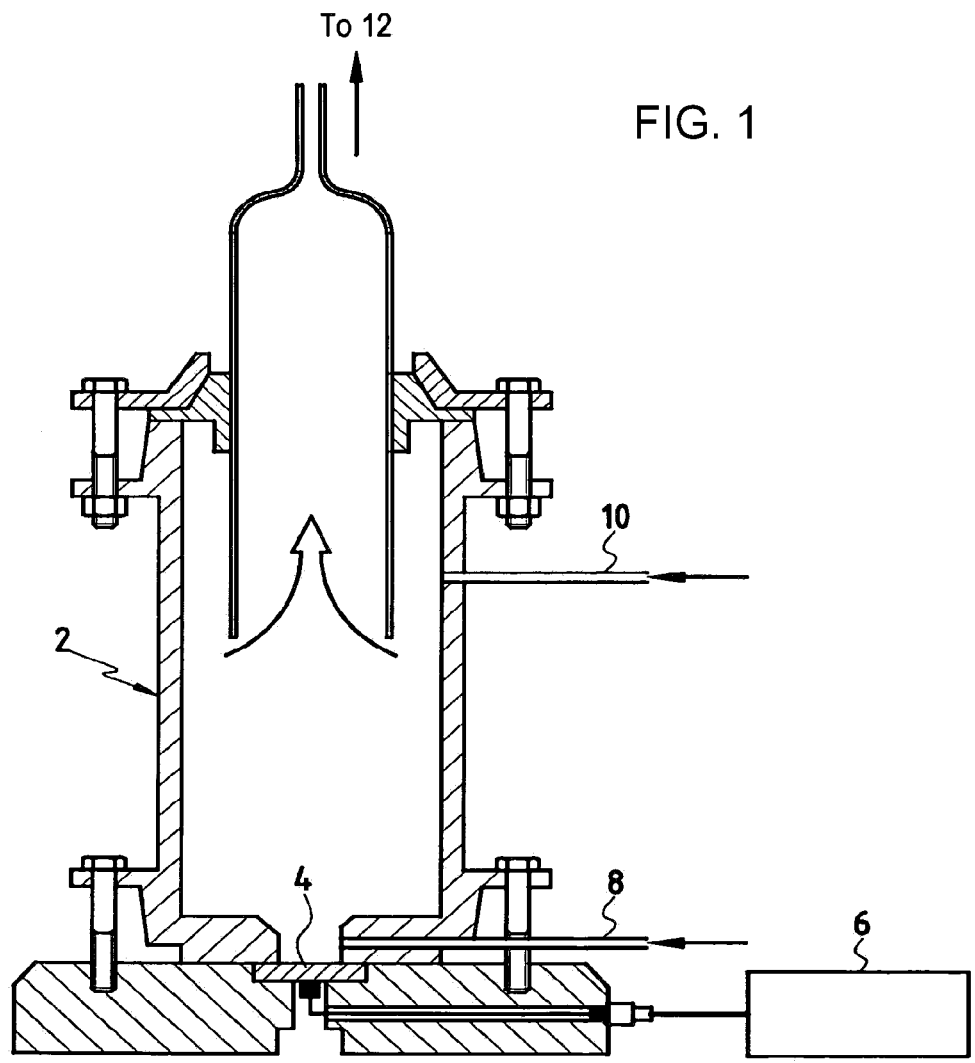
FIG. 1 is a section view of a "pyrosol" type liquid aerosol generator.
Figure 2:
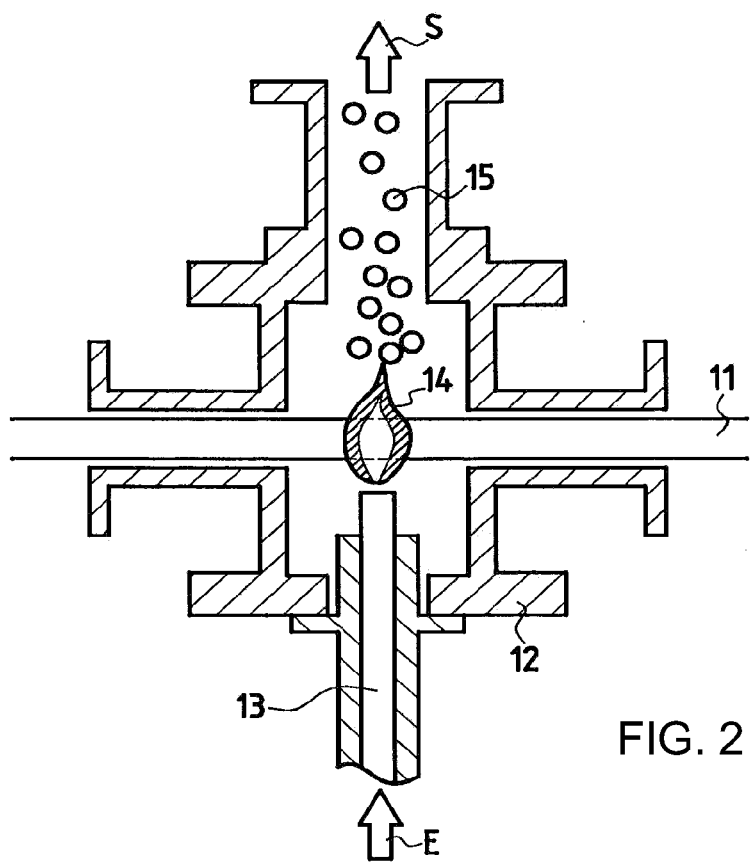
FIG. 2 is a section view of a reactor within which a reaction mixture crosses through a continuous wave $CO_2$ laser.

With reference to FIGS. 1 and 2, there follows a description of a particular example of the method of synthesizing a Si/C/N/Al/Y/O nanopowder. The nanopowder is synthesized by laser pyrolysis of a reaction mixture, itself obtained by ultrasonic spraying of a liquid mixture comprising HMDS (liquid) and two metal precursors: aluminum secbutoxide $C_{12}H_{21}O_3Al$ (liquid), and yttrium isopropoxide $C_9H_{21}O_3Y$ (salt dissolved in HMDS). In the present example, the liquid mixture was made up of 73.5% HMDS, 11.4% $C_{12}H_{21}O_3Al$, and 15.1% $C_9H_{21}O_3Y$. That mixture was suitable for spraying by means a commonly used "pyrosol" type aerosol generator, and without any particular problem.

It should be observed that other types of aerosol generator could be used for implementing the method of synthesis of the invention, such as, for example, an injector type generator.

A "pyrosol" type aerosol generator is shown in FIG. 1. It comprises a glass enclosure 2 fitted at its base with an ultrasound transducer 4. The transducer 4 is a piezoelectric pellet of barium titanate having a diameter of 40 millimeters (mm), tuned to a frequency of about 800 kilohertz (kHz). It is powered by a radiofrequency (RF) generator 6 delivering a power of 100 watts (W). The electrical oscillations are transformed by the transducer 4 into mechanical vibrations giving rise to ultrasoundwaves The above-specified liquid mixture is introduced into the glass enclosure 2 in the vicinity of the transducer 4 via a pipe 8. The ultrasound waves emitted by the transducer 4 propagate through the liquid mixture inducing a cavitation phenomenon in its subsurface zone. The cavities exploding at the surface of the liquid mixture lead to a thick mist of fine droplets being formed. The liquid aerosol as formed in this way is then entrained by an entraining gas introduced into the enclosure 2 via a pipe 10, so as to penetrate into a stainless steel reactor 12, as shown in FIG. 2. The entraining gas comprises ammonium $NH_3$, thus encouraging the formation of a nanopowder that is rich in nitrogen N.

In addition, gaseous silane $SiH_4$, forming a secondary source of Si (the main source being the HMDS), is mixed with the liquid aerosol droplets to form a reaction mixture prior to the aerosol reaching the reaction zone situated at the center of the reactor 12. Inside the reactor 12, the pressure is controlled, as is the atmosphere which is constituted by argon. The reaction mixture is then injected along arrow E into the bottom portion of the reactor 12. The stream of reaction mixture 13 crosses through an infrared $CO_2$ laser 11 emitting at 10.6 micrometers (μm). The interaction between the laser and the reaction mixture gives rise to a flame 14. The nanopowder grains 15 are produced during the laser/mixture interaction, and are then transported in a stream of argon gas along arrow S towards a collection chamber fitted with a filter. The nanopowder grains are collected in this chamber.

For a better understanding of certain steps in the above-described method, it should be observed that it can be advantageous to refer to two scientific publications dealing with synthesizing nanopowders by laser pyrolysis, and having the following references:

R. Dez, F. Ténégal, C. Reynaud, M. Mayne, X. Armand, N. Herlin-Boime, Laser synthesis of silicon carbonitride powders, structure and thermal stability, Journal of the European Ceramic Society, 22 (2002), 2969-2979; and M. Cauchetier, X. Armand, N. Herlin, M. Mayne, S. Fusil, Si/C/N nanocomposite powders with Al (and Y) additives obtained by laser spray pyrolysis of organometallic compounds, Journal of Materials Science, 34 (1999), 1-8.

Once the nanopowder was recovered, the concentration profiles (in percentage by weight) of each element in the nanopowder were initially measured at one hundred different zones of a compact of the nanopowder. The concentrations were measured using an electronic microprobe or Castaing microprobe. Furthermore, a scanning electron microscope was used to take pictures of the nanopowder.

Figure 3:
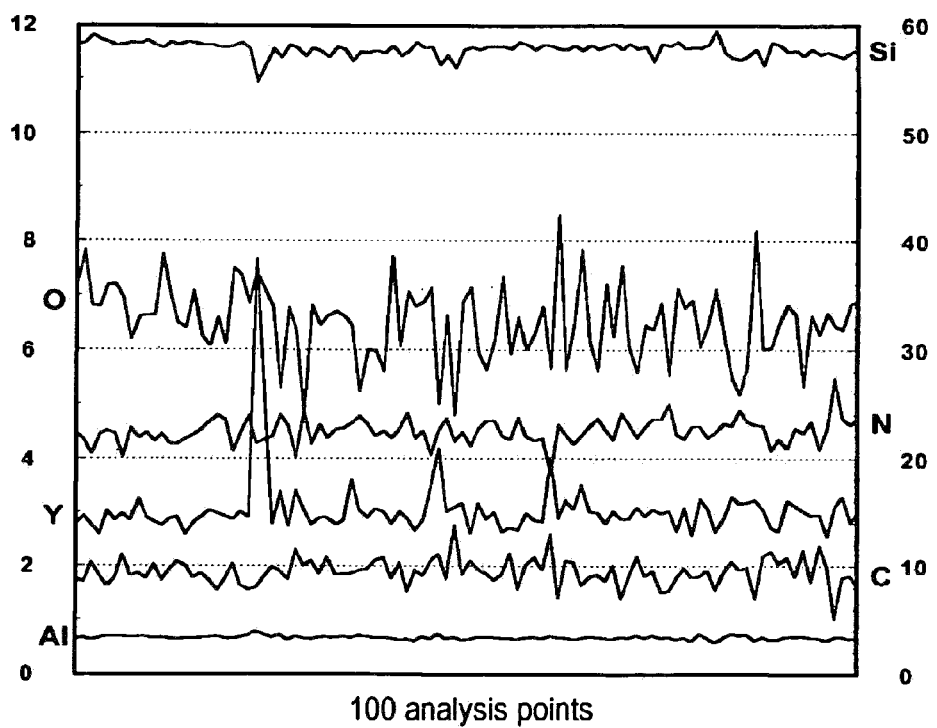
FIG. 3 shows concentration profiles (in percentages by weight) for each element in the nanopowder, obtained from one hundred different zones of a nanopowder compact of the invention.

The concentration profiles are given in FIG. 3. It can immediately be seen that the elements Al, Y, and O are indeed present throughout the nanopowder. It was observed that the density peaks correspond to grains that can be seen to be larger size in the microscope images.

Figure 4:
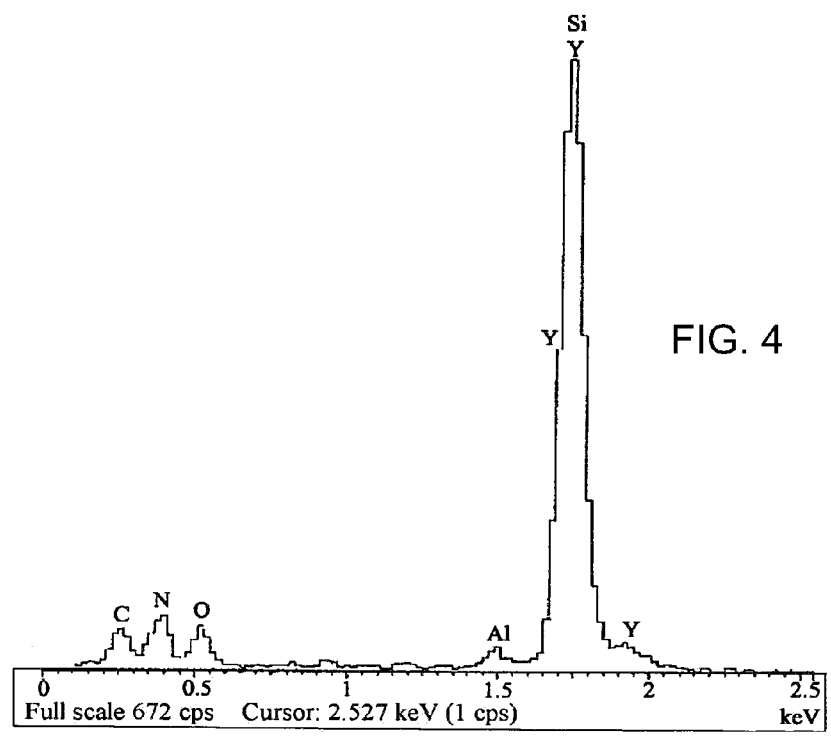
FIG. 4 is a spectrum obtained by energy-dispersive spectrometry (EDS), as performed on a grain of the nanopowder of the invention.

These results were verified by energy-dispersive spectrometry (EDS) using a 10 nanometer (nm) nanoprobe serving to analyze the nanopowder grain by grain. FIG. 4 shows one of the EDS spectra obtained from a single nanopowder grain. The spectrum conforms that all of the elements Si, C, N, Y, Al, and O are present within a single grain.

dense ceramic composite of the $Si_3N_4$/SiC type can thus be obtained easily and quickly by sintering the nanopowder of the invention.

In a variant implementation of the method of fabricating a ceramic in accordance with the invention, the nanopowder can be sintered other than by uniaxial pressing: for example it is possible to use the well-known techniques of sintering by hot isostatic pressing (HIP) or by spark plasma sintering (SPS).

The good physical properties of $Si_3N_4$/SiC type ceramics fabricated out of the nanopowder of the invention, such as high breaking strength, temperature stability, good ability to withstand thermal shock, and high toughness, make these ceramics particularly suitable for industrial applications involving thermal and mechanical stresses. Thus, the ceramic can be used in making cutting tools or ball bearings. Furthermore, the low density of these ceramics (specific gravity substantially equal to 3.2) means that they can also be used for making parts in the automobile and aerospace fields, such as engine valves, valve guides, or pistons and rotors for turbocompressors. The advantages of ceramics compared with metals are greater resistance to wear, reduction in friction forces, low coefficient of thermal expansion, low density, and the possibility of using them at higher temperatures.

TABLE

|  | Composition in terms of elements (% by weight) | | | | | | | Composition in terms of equivalent compounds (% by weight) | | | | | |
| --- | --- | --- | --- | --- | --- | --- | --- | --- | --- | --- | --- | --- | --- |
|  | Y | Al | Si | C | N | O | H | $Y_2O_3$ | $Al_2O_3$ | $Si_3N_4$ | SiC | $SiO_2$ | $C_{free}$ |
| Nanopowder A | 2.9 | 0.7 | 57.1 | 9.7 | 22.4 | 6.5 | 0.7 | 3.7 | 1.3 | 56.5 | 27.3 | 9.6 | 1.6 |
| Nanopowder B | 1.4 | 1.6 | 42.5 | 32.5 | 10.8 | 11.2 | — | 1.8 | 3.0 | 27.2 | 25.6 | 17.6 | 24.8 |

Above is a table giving the chemical composition in terms of elements and in terms of equivalent stoichiometric compounds for a nanopowder A obtained using the method of the invention as described above and for a nanopowder B obtained by a prior art method. The chemical compositions are given as percentages by weight.

It can clearly be seen from the table that the concentrations in $SiO_2$ and $C_{free}$ are much lower in the nanopowder of the invention. These low concentrations associated with the presence of all of the elements, and in particular of the sintering additive elements (Al, Y, and O) on each grain of powder, have as a first consequence the fact that the resulting nanopowder presents better temperature stability than do previously-known nanopowders (similar to B). By measuring this stability by annealing under a nitrogen atmosphere, it is found that weight loss is less than 1% at 1500° C., whereas with prior nanopowders, weight loss at 1500° C. is at least 20%. The second sequence of these low concentrations of $SiO_2$ and $C_{free}$ is that the nanopowder of the invention can be sintered without being subjected to annealing.

Figure 5:
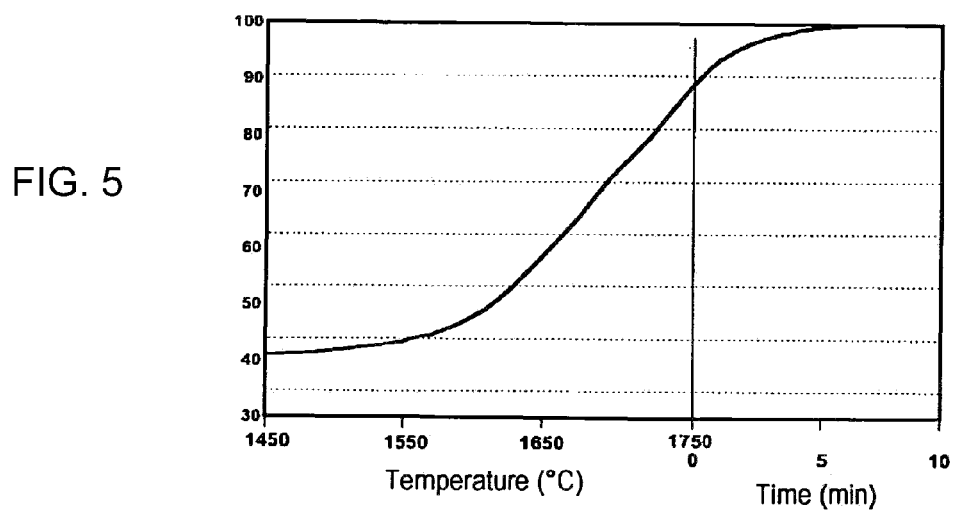
FIG. 5 is a curve showing the densification of a nanopowder of the invention.

The densification curve shown in FIG. 5 was obtained by preparing a sample of the nanopowder of the invention, placing the sample in a mold, and subjecting it to sintering by uniaxial pressing (or high pressure (HP) sintering) at a pressure of 35 megapascals (MPa) with a temperature rise gradient of 20° C./min with a pause of 10 min at 1750° C. Under such circumstances, density can be achieved that is not less than 99.5% of the theoretical density of the ceramic. A fully Finally, the refractory capacity of the ceramics, their resistance to high temperatures, and their chemical stability against molten metals enable them to be used when casting aluminum, as casting tubes, casting dies, and pump rotors.

The invention claimed is:

1. A composite ceramic of the $Si_3N_4$/SiC type prepared from a Si/C/N/$E_a$/$F_b$/$G_c$/O multielement nanopowder where E, F, and G represent three distinct metallic elements, other than Si, and where at least one of a, b, and c is non-zero, such that the grains of the composite ceramic are of a size smaller than 100 nanometers, and such that the composite ceramic has a density that is equal to at least 99.5% of its theoretical density.

2. The composite ceramic according to claim 1, wherein the metallic elements E and F are respectively aluminum (Al) and yttrium (Y).

3. The composite ceramic according to claim 1, wherein the index c of $G_c$ is zero, such that the nanopowder contains only two metallic elements, E and F.

4. The composite ceramic according to claim 2, wherein the index c of $G_c$ is zero, such that the nanopowder contains only two metallic elements, Al and Y.

5. The composite ceramic according to claim 1, wherein the multielement nanopowder is produced by laser pyrolysis.

6. The composite ceramic according to claim 1, wherein each grain of the multielement nanopowder comprises all of the elements Si, C, N, $E_a$, $F_b$, $G_c$, and O.

* * * * *